(12) United States Patent
Aronson

(10) Patent No.: US 6,630,206 B2
(45) Date of Patent: *Oct. 7, 2003

(54) METHOD FOR THE PRODUCTION OF A DEHUMIDIFYING ELEMENT

(75) Inventor: Per-Johan Aronson, Sollentuna (SE)

(73) Assignee: Proflute AB, Vallentuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/794,908

(22) Filed: Feb. 28, 2001

(65) Prior Publication Data
US 2001/0024692 A1 Sep. 27, 2001

(30) Foreign Application Priority Data
Mar. 1, 2000 (SE) ................................. 0000673

(51) Int. Cl.[7] .............................. B05D 3/10; B05D 3/00; B05D 1/18
(52) U.S. Cl. ............................... 427/397.8; 427/398.1; 427/430.1; 427/439; 427/443.2; 427/337
(58) Field of Search .................... 427/398.1, 397.8, 427/430.1, 443.2, 439, 337

(56) References Cited

U.S. PATENT DOCUMENTS 3,826,703 A * 7/1974 Russell ........................ 156/189
4,886,769 A * 12/1989 Kuma et al. .................. 502/62
4,911,775 A * 3/1990 Kuma et al. .................. 156/208
5,423,934 A 6/1995 Vangbo et al.
5,496,397 A * 3/1996 Fischer et al. ................ 96/154
6,265,030 B1 * 7/2001 Aronson ..................... 427/397.8

FOREIGN PATENT DOCUMENTS

| EP | 1006238 | 7/2000 |
| SE | 460705 | 11/1989 |
| SE | 501507 | 3/1995 |
| WO | WO 93/08910 | * 5/1993 |

* cited by examiner

Primary Examiner—Michael Barr
(74) Attorney, Agent, or Firm—Young & Thompson

(57) ABSTRACT

The present invention relates to a method of impregnating paper with a suspension of a molecular sieve in waterglass, such as soda waterglass or potassium waterglass, wherein the impregnated paper can be used as a dehumidifying element, and wherein the method comprises the steps of a) providing a piece of paper, such as facing paper and/or fluted paper;

b) immersing the paper into a highly concentrated waterglass solution in which a molecular sieve has been suspended, at a temperature in the range of 45–95° C., wherein said suspension of highly concentrated waterglass/molecular sieve has a viscosity of at least 350 mPa.s at a temperature of 45° C.; and c) cooling the immersed paper with air at a temperature of at most 35° C. and preferably at most 25° C.

10 Claims, 4 Drawing Sheets

METHOD FOR THE PRODUCTION OF A DEHUMIDIFYING ELEMENT

The present invention relates to the dehumidification of air with the aid of a dehumidifying element that comprises a fibre matrix which has been impregnated with waterglass and which also includes a molecular sieve. More specifically, the invention relates to a method of manufacturing a dehumidifying element.

TECHNICAL BACKGROUND

Figure 3:
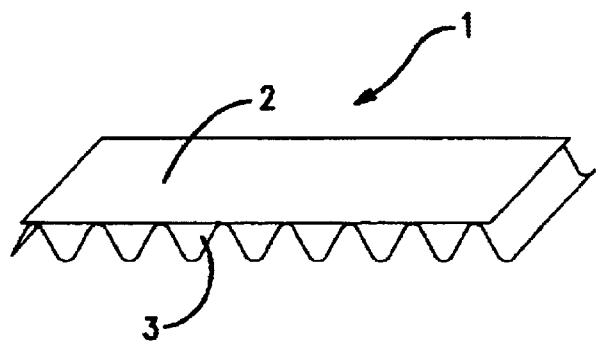
Figure 4:
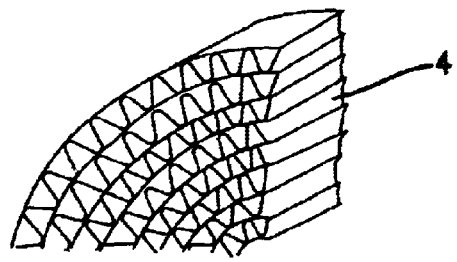

Air dehumidification is conventionally achieved with a type of dehumidifying element that can be produced by joining together flat and corrugated or fluted fibre material having moisture absorbent properties, to form a laminate that is rolled-up into a rotor-form or stacked in the form of a block. Such laminates are shown in FIG. 3. The dehumidifying element can be likened to corrugated board that has been rolled-up to provide a rotor, or corrugated board that has been cut into lengths and stacked in block form. This element includes a structure that has many parallel channels. The corrugations or flutes are normally from 1.5 to 3 mm high and the channels have a length of from 50 to 400 mm. FIG. 4 shows a part-sector of one such rotor.

Figure 5:
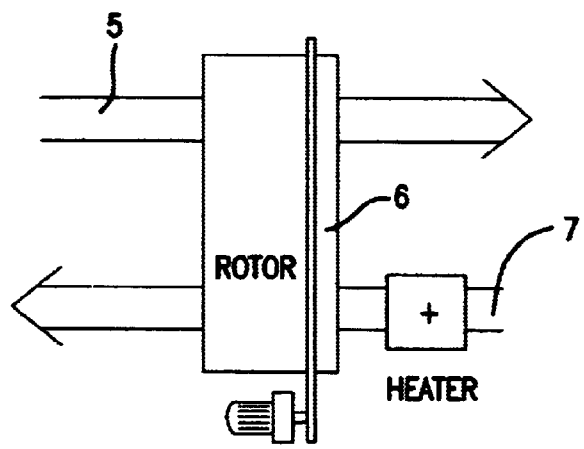

A rotor is cut from the roll or block of rolled material and ground, and is often provided with a hub, spokes and/or a skirt. The rotor constitutes "the heart" of an air dehumidifier, wherewith the air is driven through the multiple of channels in the rotor by means of a blower. Because the channel walls contain a moisture absorbing substance, the air will be dry after having passed through the rotor. A small heated air flow passes through a smaller sector of the rotor and expels the air present in this sector. Dry air can be produced continually, by continuously rotating the rotor between the sectors with air to be dehumidified and heated air. The expelled moisture is carried away with the heated air flow in a separate channel system. This principle is also shown in FIG. 5.

SE B 460 705 describes a method of producing a dehumidifying element in which paper that contains ceramic fibres is impregnated with a waterglass solution prior to or subsequent to lamination, wherein the paper is heated and dried subsequent to impregnation, to form hydrated waterglass having a water content of 3–20%. The matrix thus formed is then immersed in acid so as to form a silica-hydrogel.

SE B 460 021 also relates to a dehumidifying element that is comprised of a laminate of sheet of ceramic fibres that is fluted on one side and that has a paper thickness of 0.18–0.25 mm, a flute length of 2.5–4.2 mm and a flute height of 1.5–2.3 mm. This laminate is impregnated with an active silicon dioxide-aluminium oxide-aerogel consisting of 97–85% silicon dioxide and 3–15% aluminium oxide. The element is produced by immersing ceramic paper in an aqueous solution of waterglass and then drying the paper. The paper is then immersed in an aqueous solution of aluminium sulphate and then dried again.

SE B 462 671 also describes a method of producing a dehumidifying element in which a laminate comprising a corrugated or fluted sheet and a facing sheet is impregnated with an aqueous solution of waterglass, followed by drying and heating the laminate to a water content of 5–45% and thereafter immersing the laminate in an aqueous metal salt solution, and finally further drying and heating the laminate.

SE B 469 976 teaches a method of producing dehumidifying elements in which paper webs that contain a mouldable material, such as fibre glass or cellulose, are saturated with concentrated waterglass solution and dried to a dry solids content of 45–65% with respect to waterglass, and then corrugated, whereafter the resultant laminate is dried to a dry solids content of about 60–95%.

EP B 0 642 384 relates to a method of treating dehumidifying elements with the aim of influencing the pore size of the silica gel. This is achieved by treating the elements with an acid, base and a stabilising solution that contains salts of zinc, aluminium and phosphate. Waterglass is applied to the paper and the waterglass then dried, also in this case.

All of the above applications disclose an impregnation step followed by a drying step in conjunction with manufacture of dehumidifying elements that consist of a silica gel matrix. Drying stages are energy demanding and thereby lead to high costs. Moreover, it is difficult to apply sufficient quantities of waterglass when the solution has the low concentration required by known techniques, meaning that the dehumidifying elements produced will have a limited silica gel content and therewith a less than optimal capacity. There is thus a need for improved methods that will lower production costs and increase performance and the quality of the end product.

In certain applications of dehumidifying elements, it is necessary for the dehumidified air to be very dry. For example, a dew point of beneath −40° C. is required when drying plastic granules for the manufacture of PET-products, while still lower moisture contents are sometimes required in respect of dehumidifying air in chambers where moisture sensitive products are tested.

A rotor that contains silica gel as a hydroscopic substance can not reach these states without unreasonably high energy consumption by the regeneration process. Thus, there is also a need for novel dehumidifying elements that are able to generate still drier air than that which can be achieved with a dehumidifying element based on silica gel.

SUMMARY OF THE INVENTION

It has now been found possible to completely eliminate the drying stage after immersion of paper in the waterglass solution while, at the same time, increasing the amount of silica gel matrix applied and to produce finally a dehumidifying element that is able to dry air to a dew point beneath −40° C., by means of a method comprising the steps of a) providing a piece of paper, such as facing paper and/or fluted paper;

b) immersing said paper in a highly concentrated waterglass solution in which a molecular sieve has been suspended, at a temperature within the range of 45–95° C., wherein said suspension of highly concentrated waterglass/molecular sieve has a viscosity of at least 350 mPa.s at a temperature of 45° C.; and c) cooling the immersed paper with air having a temperature of at most 45° C. and preferably at most 25° C.

DETAILED DESCRIPTION OF THE INVENTION

A moisture adsorbent that enables air to be dried to very low moisture contents is a molecular sieve. The adsorbent is also called molecular screen, mole screen or zeolite. According to the present invention, a molecular sieve is a highly porous crystalline aluminium silicate which contains in its crystalline structure a large number of very small pores of equal pore opening diameters. Moisture is attracted to the surface and the attraction force is high, particularly on the inside of the pores. In order for molecules to fasten within the pores, it must be possible for the molecules to enter through the pore openings, which have a diameter of between 3 and 10 Å in respect of different molecular sieves. The water molecule is small and is able to enter the pores, whereas larger molecules are unable to enter and instead pass by the sieve.

Molecular sieves based on aluminium silicate attract polar substances, such as water, with greater or lesser power. A molecular sieve of this nature is thus hydrophilic. The attractive force of the sieve diminishes when the aluminium content decreases. The silicate crystal becomes hydrophobic when containing only a small amount of aluminium or no aluminium at all, and can be used for the adsorption of hydrophobic substances, such as organic solvents for instance. Thus, it is necessary in conjunction with the present invention to utilise hydrophilic molecular sieves, for instance sieves that have a high aluminium silicate content.

Figure 6:
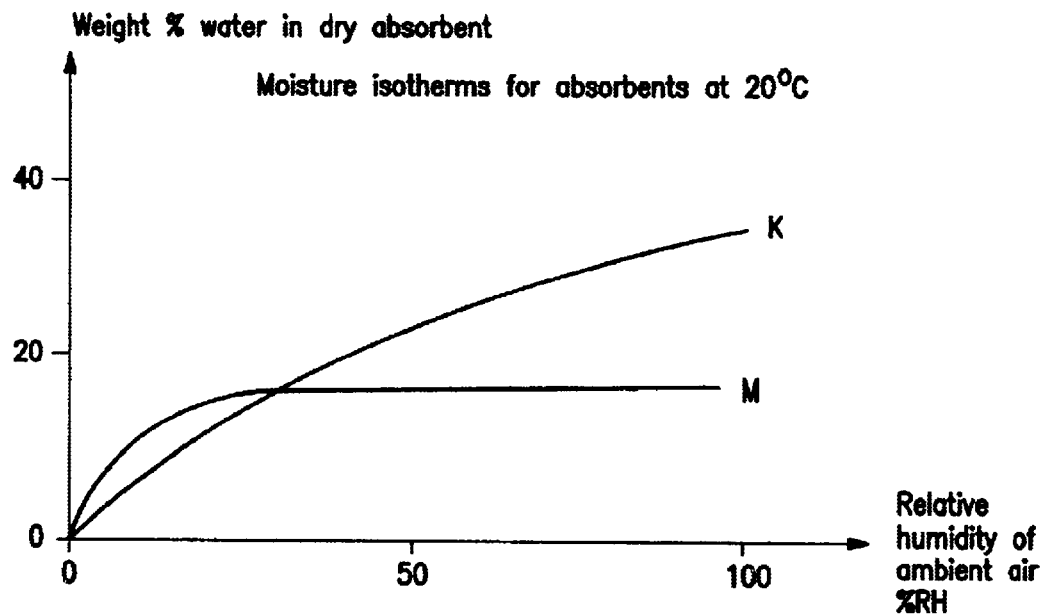

The vapour pressure across a hydrophilic molecular sieve that has a given moisture content is much lower than, for instance, the vapour pressure across silica gel that has the same moisture content in a range where said moisture content is relatively low. Expressed in another way, a molecular sieve is able to take-up more water than silica gel, when the ambient air has a low relative humidity. This can be illustrated in a so-called adsorption isotherm in which the adsorption of moisture in weight-% with respect to a moisture free adsorbent is plotted against the relative humidity of the air at equilibrium and at a certain given temperature. FIG. 6 shows examples of such curves.

As a result of these properties, a molecular sieve will have an improved moisture pick-up capacity at elevated temperatures, since the increase in temperature lowers the relative humidity of the air to the region in which molecular sieves have a greater capacity. It is also apparent from the isotherm that the adsorption capacity of silica gel is superior to that of molecular sieves when needing to obtain air that has a very low moisture content.

The term "waterglass" as used in this document relates to aqueous solution of sodium silicate ("soda waterglass") or potassium silicate ("potash waterglass"). Soda waterglass and potash waterglass are often designated as $(Na_2O)_m(SiO_2)_n$ and $(K_2O)_m(SiO_2)_n$ respectively. As is apparent, the mole ratio between the two oxides (n/m) can vary. In the case of the present invention, soda waterglass with n/m within the range of 3.2–3.5 is preferred, and waterglass with n/m from 3.3 to 3.4 is particularly preferred.

The term "highly concentrated waterglass" as used in this document refers to waterglass that has a viscosity of at least 350 mPa.s at 45° C. The upper viscosity limit is 800 mPa.s at 95° C. The viscosity of highly concentrated waterglass at room temperature is so high as to make it extremely difficult to immerse or dip paper in or into the water-glass at this temperature in practice so as to cause the waterglass to wet the paper. Typical concentrated waterglass according to known technology has a viscosity of up to 200 mPa.s at 20° C. Highly concentrated waterglass, on the other hand, has a considerably higher viscosity at 20° C. and in its least concentrated form can be likened to cold syrup.

The term "paper" as used in this document relates to sheets produced from organic fibres, such as cellulose, or from inorganic fibres, such as ceramic fibres, glass fibres, slag fibres, carbon fibres, and mineral fibres and mixtures thereof. Inorganic fibres are preferred. It is also preferred in accordance with the invention to use glass fibres and/or mineral fibres with an admixture of up to 20% cellulose fibres or synthetic fibres. The paper will typically have a thickness of 0.1–0.3 mm. The flute height of the fluted paper is typically in the range of 1–5 mm and its flute length is typically in the range of 1.5–7 mm. A typical weight of the paper is 20–50 g/m².

As mentioned above, the invention has as its starting point a method of manufacturing dehumidifying elements which consist of a paper matrix that has been impregnated with waterglass that includes a molecular sieve for later conversion to silica gel. Instead of using concentrated waterglass as a the silica-gel starting material, there is used a highly concentrated waterglass. This latter waterglass is so highly viscous as to make it impossible in practice to impregnate paper with the waterglass at room temperature. However, the highly concentrated waterglass becomes thinly fluid when heated to a temperature of 45–95° C. and will function in the manner of concentrated waterglass. The molecular sieve is suspended in this heated superconcentrated waterglass. The paper to be impregnated is thus immersed into the hot waterglass containing said molecular sieve and then cooled with air heated to a temperature of at most 35° C., preferably at most 25° C. No drying is required. The cooled impregnated paper also has good adhesive properties and can be readily joined.

Highly concentrated waterglass may, for instance, be produced by vaporising part of the water present in concentrated waterglass prior to manufacture.

In conventional processes, the paper impregnated with waterglass is heat dried, wherewith the waterglass becomes thinly fluid and begins to run. The risk of the waterglass becoming thinly fluid is not found in the process according to the invention, since the highly concentrated waterglass solidifies in the cooling stage.

A subsequent so-called gelling stage can be carried out in different ways, depending on the desired end properties of the dehumidifying element.

The waterglass is converted to a silica gel that binds the molecular sieve powder, by dipping or immersing the paper impregnated with waterglass into or in a concentrated aqueous solution of metal salt (examples of suitable metal salts in this respect are disclosed in SE B 462 671). When the salt used is comprised, for instance, of aluminium sulphate, aluminium phosphate, aluminium nitrate or magnesium sulphate, the gel will have relatively good moisture adsorbency in moist air and in air of average humidity and the rotor will obtain a mixture of the properties of the silica gel and the molecular sieve. However, the deep-drying capacity of the molecular sieve will be unused to some extent, since a great deal of the energy in the heated regenerating air is consumed in expelling the more lightly regenerated water that has bee adsorbed by the silica gel.

An alternative method of converting the waterglass into a good molecular sieve carrier is to expose the impregnated paper to a carbon dioxide atmosphere. The carbon dioxide converts the waterglass into a mechanically highly stable gel that has per se a relatively poor water vapour adsorption capacity. The dehumidifying element is given more pronounced molecular sieve properties in this way. The resultant matrix is washed with water after this stage and dried to the finished product.

This process has many advantages. The highly concentrated waterglass gives a mechanically stronger dehumidifying element, since the final gel/molecular sieve coating becomes higher. The dehumidifying capacity of said element becomes higher for the same reason. Energy consumption, and therewith production costs, become lower, because no drying is required after impregnation. A large amount of energy is required to dry wet paper, since it is necessary to use hot air or IR-lamps to this end. Neither need expensive drying equipment be provided. Finally, the properties of the product are improved, since there is no risk of the waterglass/molecular sieve mixture beginning to run after impregnation.

Figure 1:
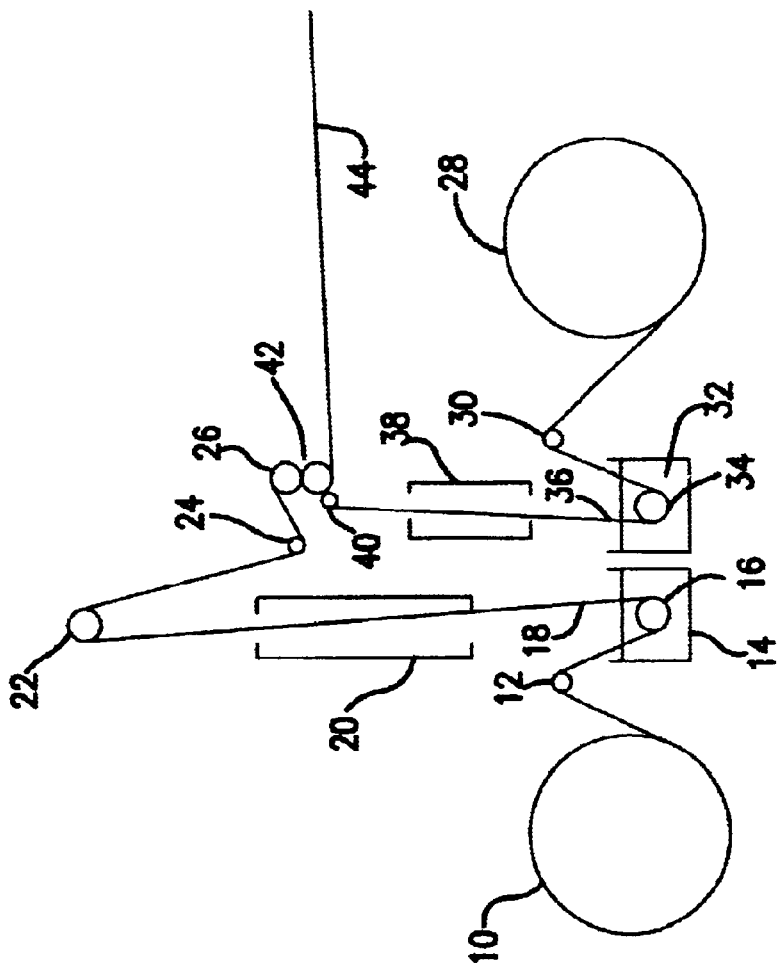
Figure 2:
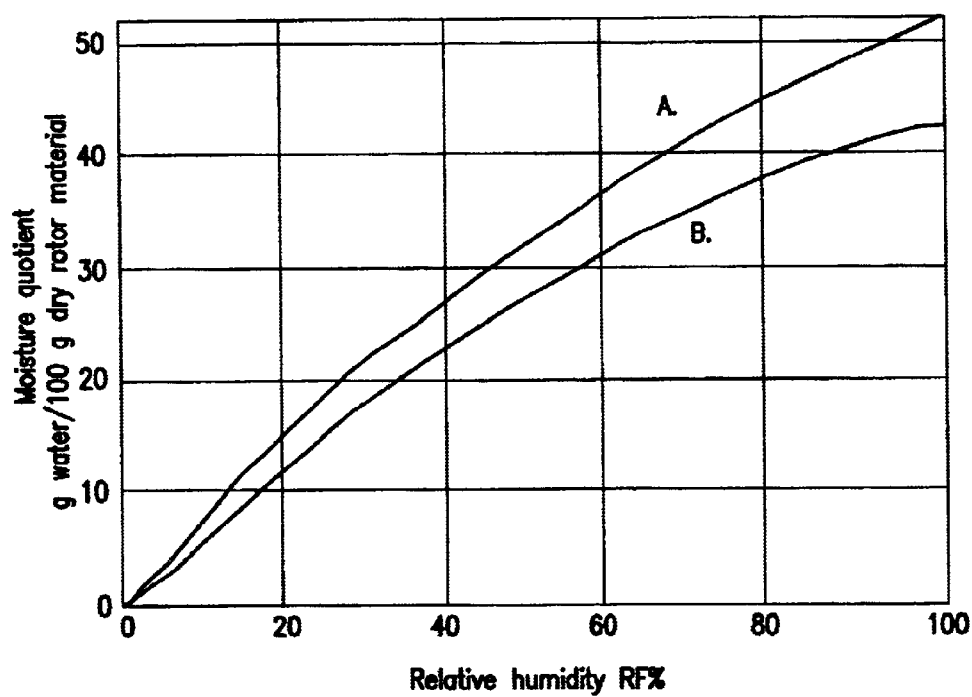
Figure 7:
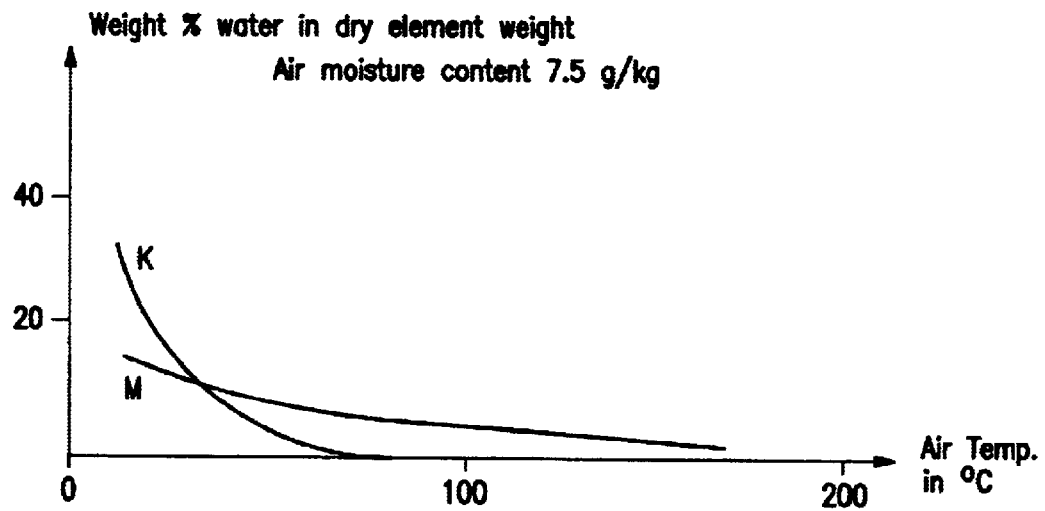

The invention will now be described in more detail with reference to the accompanying drawings, in which FIG. 1 is an explanatory sketch of a process for producing a dehumidifying element in accordance with the invention;

FIG. 2 is a diagram showing equilibrium curves for materials used in the production of dehumidifying elements that lack a molecular sieve, wherein the moisture quotient (g absorbed water/100 g dry material) is plotted as a function of the relative moisture content of a material produced with highly concentrated waterglass (A) on the one hand and a material produced in accordance with known technology (B) on the other hand;

FIG. 3 illustrates a laminate 1 comprised of facing paper 2 and fluted paper 3 used in the production of an air dehumidifier rotor;

FIG. 4 is a sectorial view of the finished dehumidifier rotor 4, said rotor being constructed of a laminate such as that shown in FIG. 3, and wherein said laminate has been wound around an axis in the manufacture of the rotor;

FIG. 5 illustrates the principle according to which the humidifying element works, wherein the air 5 to be dehumidified is allowed to flow through channels in a rotating dehumidifying element 6, and wherein air 7 is allowed to pass in contraflow through another sector of the rotating dehumidifying element at the same time;

FIG. 6 shows two adsorption isotherms relating to silica gel (K) and to molecular sieve (M) respectively, wherein one adsorption isotherm shows the moisture adsorption in weight-% in respect of a moisture-free adsorbent as the function of the relative humidity of the air at equilibrium and at a certain given temperature; and FIG. 7 shows the moisture absorbency of an inventive dehumidifying element (with molecular sieve) (M) and a dehumidifying element that lacks a molecular sieve (K), wherein the moisture absorbency is given in weight-% water calculated on a dry dehumidifying element as a function of the ambient air temperature; and wherein the moisture content of the air is constant at 7.5 g/kg.

The reference numerals 10 and 28 in the plant shown in FIG. 1 identify paper web rolls. Paper web is unrolled from the paper roll 10 and passed over a guide roller 12 down into a bath 14 that contains heated, highly-concentrated waterglass. Data concerning typical highly-concentrated waterglass suitable for the production of the humidifying elements that lack a molecular sieve (not in accordance with the invention) will be evident from table 1 below.

TABLE 1

An example of data relating to highly concentrated waterglass solutions

| Mole ratio $SiO_2/Na_2O$ | 3.3–3.4 |
| Density (kg/dm$^3$) | 1.41–1.45 |
| Usable in the range | 45–90° C. |
| Optimum density (kg/dm$^3$) | 1.43 |
| Optimum temperature | 70° C. |

Table 2 below sets forth two examples of highly concentrated waterglass solutions according to Table 1, and their viscosities. The solutions are chosen so as to lie close to the viscosity limits that apply to highly concentrated waterglass solution in accordance with the invention.

TABLE 2

Examples of data relating to two highly concentrated waterglass solutions

| | Example A | Example B |
|---|---|---|
| Mole ratio (SiO$_2$/Na$_2$O) | 3.35 | 3.35 |
| Density/kg/dm$^3$) | 1.425 | 1.450 |
| Viscosity | 377 mPa · s at 45° C. | 800 mPa.s at 90° C. |

The paper web 18 is guided down beneath the level of the highly concentrated, hot (having a temperature of from 45–95° C.) waterglass solution in the bath 14 with the aid of a roller 16 submerged in the solution. The paper web 18 is drenched in highly concentrated waterglass solution as it passes through the bath 14, such as to become saturated with said solution. Subsequent to saturation of the paper web, the web is passed up through a cooling chamber 20 in which air at room temperature is blown onto the web 18. The web 18 is then delivered to a fluting roll 26, via guide rollers 22 and 24, to form fluted paper that includes a large number of small flutes. As before mentioned, the resultant fluted paper will typically have a flute height of 1–5 mm and a flute length of 1.5–7 mm. A second paper web 36 is unwound from the paper roll 28 and passed, via a guide roller 30, to a bath 32 that contains heated, highly concentrated waterglass solution into which the web 36 is immersed via a roller 34. The web 36 is saturated with solution and allowed to pass up through a cooling chamber 38, in which room temperature air is blown onto said web. The web 36 is passed, via a guide roller 40, from the cooling chamber 38 to a web combining roller 42 where the two webs 18 and 36 are joined to an impregnated corrugated paper matrix. No glue is required in this regard, as the impregnated paper webs 18 and 36 readily adhere to one another after the cooling stage.

The process results in a matrix that contains 10–35% more silica gel than matrices formed in accordance with known techniques when starting from the same type of paper, applying the same volume of waterglass, and creating the same type of matrix both geometrically and dimensionally. This is illustrated in FIG. 2, which shows two equilibrium curves for material in dehumidifying elements. Curve A relates to a material produced with highly concentrated waterglass, whereas curve B represents a material produced in accordance with SE 469 976. Neither A nor B relates to material that includes a molecular sieve. It is assumed that A and B have been produced from identical fibre paper as a starting material, and that said paper has been coated with layers of highly concentrated waterglass of equal thickness in respect of curve A and conventionally concentrated waterglass in respect of curve B.

Manufacture of a Dehumidifying Element in Accordance with the Invention (Including a Molecular Sieve)

A highly concentrated waterglass having a composition according to Table 3 below is used in the manufacture of an inventive dehumidifying element.

TABLE 3

Examples of data for highly concentrated waterglass solutions in
the manufacture of dehumidifying elements that include a molecular sieve

| | |
|---|---|
| Mole ratio $SiO_2/Na_2O$ | 3.3–3.4 |
| Density (kg/dm$^3$) | 1.39–1.43 |
| Usable within the range | 45–90° C. |
| Optimum density (kg/dm$^3$) | 1.41 |
| Optimum temperature | 70° C. |

Because the addition of the molecular sieve has a viscosity increasing effect, the highly concentrated waterglass will preferably have a slightly lower viscosity than would otherwise be the case.

A powder molecular sieve of hydrophilic type and having pore opening diameters of between 3 and 10 Å is added to hot highly-concentrated waterglass of the type set forth in Table 3 and blended to form an homogenous suspension. The composition of the resultant suspension may vary from 5 to 40 kg molecular sieve per 100 kg highly concentrated waterglass, depending on the desired strength of the character of the molecular sieve in the end product (the deep drying capacity of the sieve). A molecular sieve content of above 40 kg per 100 kg highly concentrated waterglass results in a suspension of a manageable high viscosity. When the molecular sieve content is below 5 kg per 100 kg highly concentrated waterglass, the adsorption contribution of the molecular sieve will be low in the final dehumidifying element.

Paper is immersed in this suspension and then cooled, fluted, and rolled-up or laid in a block to form a matrix in the manner described above.

The matrix is then allowed to lie in a carbon dioxide ($CO_2$)-atmosphere or is immersed in a concentrated metal salt solution, wherewith the waterglass is converted to a solid water-insoluble gel. The reaction products from the gelation process are then washed-out with water and the matrix is dried to provide a finished product.

A dehumidifying element produced in this way obtains properties that are a combination of the good ability of the gel to take-up moisture at high relative humidities and the good ability of the molecular sieve to take-up moisture at low relative humidities. As earlier mentioned, the fact that no energy demanding and not-readily controlled drying stages and drying equipment are required is a great advantage.

EXAMPLE 16 kg molecular sieve of type 4A (Sylosiv A4, GRACE Davison, US) (pore opening diameter: ~4 Å) were added to 100 kg of highly concentrated waterglass of the type soda waterglass having an $SiO_2/Na_2O$ mole ratio of 3.35 and a density of 1.40 kg/dm$^3$ and a temperature of 70° C. This mixture was then used in the manufacture of a moisture exchange element in accordance with the invention. A reference element that lacked a molecular sieve was also produced.

The ability of the elements to take-up moisture at equilibrium was then measured, the results of this measurement being shown in FIG. 7. The moisture absorbency of the elements is given as weight-% water calculated on dry dehumidifying elements as a function of the temperature of ambient air. The moisture content of the air was at a constant 7.5 g/kg. The curve corresponding to the inventive element is designated (M), whereas the curve corresponding to the reference element is designated (K). The curves clearly show that the inventive molecular sieve element has a greater moisture absorbing capacity at low relative humidities—higher temperatures, while the opposite is the case at high relative humidities. The curves cross one another immediately above a 20% relative humidity (corresponding to about 32° C. at 7.5 g water/kg air in the example).

What is claimed is:

1. A method of impregnating paper with waterglass, wherein the impregnated paper can be used as a dehumidifying element, and wherein the method comprises the steps of
   a) providing a piece of paper;
   b) immersing the paper into a highly concentrated waterglass solution in which a molecular sieve has been suspended, at a temperature in the range of 45–95° C., wherein said suspension of highly concentrated waterglass/molecular sieve has a viscosity of at least 350 mPa.s at a temperature of 45° C.; and
   c) cooling the immersed paper with air at a temperature of at most 35° C. without heating and drying the paper after step b).

2. A method according to claim 1, characterised in that the suspension includes 5–40 kg molecular sieve suspended in 100 kg highly concentrated waterglass.

3. A method according to claim 1, characterised in that the highly concentrated waterglass solution has a viscosity of at most 800 mPa.s at a temperature of 95° C.

4. A method according to claim 1, characterised in that the waterglass is a soda waterglass.

5. A method according to claim 4, characterised in that the $SiO_2/Na_2O$ mole ratio in the soda waterglass is 3.2–3.5.

6. A method according to claim 5, characterised in that the $SiO_2/Na_2O$ mole ratio in the soda waterglass is 3.3–3.4.

7. A method according to claim 1, characterised in that the paper is produced from inorganic fibres.

8. A method according to claim 7, characterised in that the weight of the paper is 20–50 g/m$^2$ before impregnation.

9. A method according to claim 1, characterised by immersing the paper after step c) in an aqueous solution of a metal salt and an acid.

10. A method according to any one of claims 1–8, characterised by placing the paper in a carbon dioxide atmosphere after step c).

* * * * *